United States Patent [19]

Trommen

[11] Patent Number: 4,903,442
[45] Date of Patent: Feb. 27, 1990

[54] MAST FOR MEASURING OR ILLUMINATION PURPOSES, ESPECIALLY FOR FLIGHT NAVIGATION LIGHTS

[75] Inventor: Hartmut Trommen, Postbauer-Heng, Fed. Rep. of Germany

[73] Assignee: G. A. Pfleiderer GmbH & Co. KG, Neumarkt, Fed. Rep. of Germany

[21] Appl. No.: 248,455

[22] Filed: Sep. 23, 1988

[30] Foreign Application Priority Data

Sep. 23, 1987 [DE] Fed. Rep. of Germany ....... 3731931

[51] Int. Cl.4 .......................... F21J 13/10; E21B 3/02; E21B 13/10
[52] U.S. Cl. .................................. 52/116; 174/45 R; 362/431
[58] Field of Search ................. 52/116, 117, 118, 119, 52/123.1, 721, 715; 362/431; 174/45 R

[56] References Cited

U.S. PATENT DOCUMENTS

| 2,456,179 | 12/1948 | Fi er | 362/431 |
| 2,985,261 | 5/1961 | Kubesh | 362/431 |
| 3,100,555 | 8/1963 | Ashton | 174/45 R |
| 3,222,509 | 12/1965 | Thedford | 362/431 |
| 3,364,635 | 1/1968 | Guggemos | 362/431 |
| 3,574,104 | 4/1971 | Medler | 174/45 R |
| 3,605,359 | 9/1971 | Bader | 52/116 |
| 3,671,738 | 6/1972 | Beachley | 362/431 |
| 3,995,701 | 12/1976 | Kelley | 52/116 |
| 4,220,981 | 9/1980 | Koether | 362/431 |
| 4,228,487 | 10/1980 | Hesse | 362/431 |
| 4,769,967 | 9/1988 | Bourrieres | 174/45 R |

Primary Examiner—John E. Murtagh
Attorney, Agent, or Firm—Jordan and Hamburg

[57] ABSTRACT

A mast for measuring or illuminating purposes, especially for flight navigation lights or for wind measuring devices, which is designed as a glass-fiber or carbon-fiber reinforced plastic mast.

3 Claims, 2 Drawing Sheets

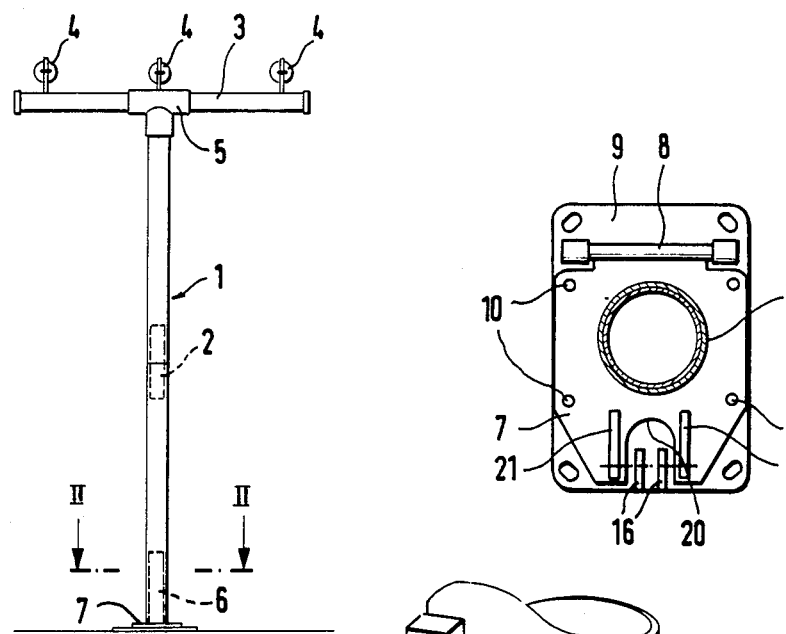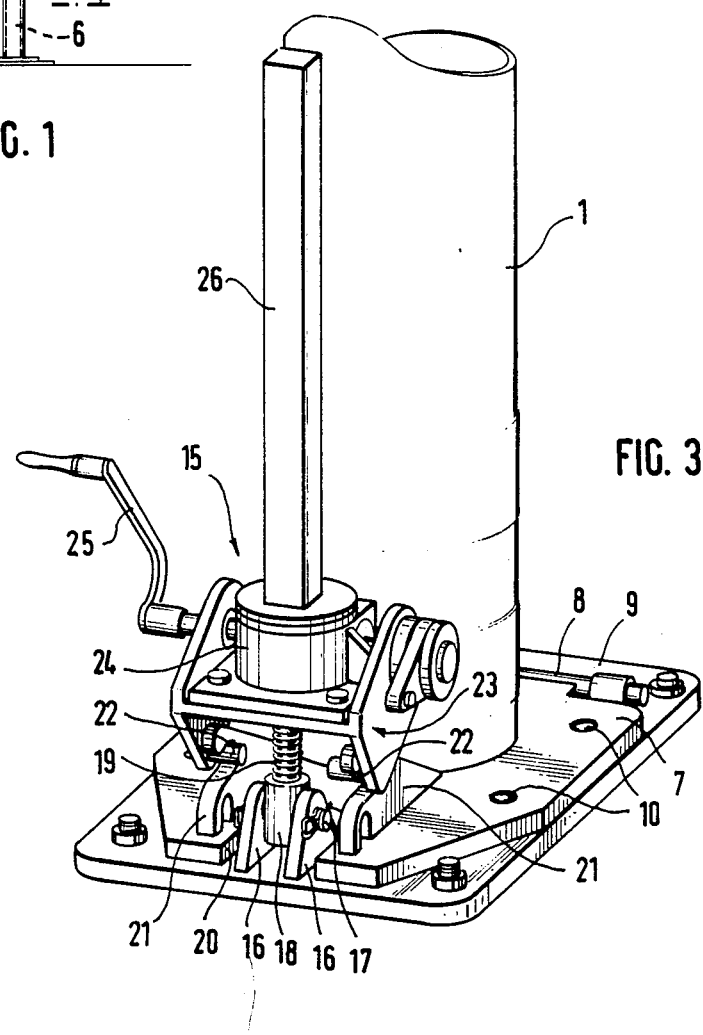

MAST FOR MEASURING OR ILLUMINATION PURPOSES, ESPECIALLY FOR FLIGHT NAVIGATION LIGHTS

The invention is directed to a mast for measuring or illuminating purposes, especially for flight navigation lights or for wind measuring devices.

Such masts usually consist either of steel or of concrete. This not only makes their manufacture and mounting extraordinarily complicated (among other, reasons because of their weight), but furthermore also entails the difficulty that considerable dangers are involved in possible collisions, which can never be excluded in connection with flight navigation lights. To this must be added that a height adjustment is necessary, especially with masts for flight navigation lights, so that all the cross-arms, which bear the special lights, are truly disposed in one plane. But this creates great difficulties since, along the long stretches where such a row of masts is set up, ground irregularities must also be taken into account. Finally, especially with flight navigation lights, the lifetime of the light is relatively short due to their high power, so that they must be replaced very frequently, and this again entails difficult maintenance problems because of the necessity of climbing the masts.

It is therefore an object of the present invention to provide a mast for measuring or illuminating purposes, which can be manufactured simply, cheaply, dimensionally true in arbitrary dimensions, and which not only reduces the risk concomitant with possible collisions with vehicles, but also offers easier accessibility to the lights or equipment fastened to it.

To achieve this objective, the invention provides that the mast is designed as a glass-fiber reinforced plastic mast, fabricated by a rotary molding process, and consisting in particular of polyester resin.

Such a plastic mast is considerably lighter than the previously used steel or concrete masts. In the proposed plastic product, the glass-fiber reinforcement can also fulfill all stability requirements which are imposed on illuminations according to the FAA Specification AC 150/5345-45. On the other hand, such a glass-fiber reinforced plastic mast has the advantage that it can break in case of a collision. The masts rupture at impact speeds of 50 km/h. Such masts, therefore, create substantially less risk for colliding aircraft or generally also for other vehicles, when these masts are used as illumination masts or for measuring purposes. Safety is also increased still more by virtue of the fact that no sparks can arise in case of a crash, so that there is no danger of explosion.

The inventive plastic mast is considerably more economical than a steel or concrete mast, which again results in a more economical foundation layout, more economical transport, as well as faster mounting. Furthermore, such a mast does not require maintenance, since it is not subject to corrosion and also requires no paint.

Finally, there is another advantage in connection with flight navigation lights, which should not be underestimated, namely that such a glass-fiber reinforced plastic mast cannot interfere with approach radar systems.

The light structure of the inventive mast finally has still another quite decisive advantage. Namely, it offers the possibility of mounting the mast so that it can easily tilt on its foundation. Consequently, when equipment is changed, in particular navigation lights are replaced, the mast can simply be tilted and subsequently erected again.

For this purpose, it is especially advantageous for the mast to have a base plate, which is hinged laterally at a foundation plate, which can be arrested on the opposite side at the foundation plate, and in particular which can be screwed on by means of occludable screws.

This base can preferably be connected to the plastic mast by means of a welded-on metal pipe that is laminated into the mast. On the other side, a possible cross-arm of the mast should be connected similarly, preferably by a T-piece that is laminated into the upper end of the mast.

To tilt and again erect such a pivotable mast that is hinged at the foundation plate by means of a base plate, one can use, for example, a cable winch with a relatively low cable deflection mast that can easily be set up on the ground. The cable winch is easily held stationary, for example by means of a ground anchor or by binding it fast to a heavy vehicle. However, the process of tilting over a cable deflection mast is used to lift the mast which at first lies flat on the ground, since this requires a pull, which is slanted upwards and which can be achieved only by such a cable deflection mast.

The inventive plastic masts can be tilted and erected again still more simply and especially without requiring a cable winch and of such a cable deflection mast, in the following fashion. The base plate and the foundation plate have connecting elements for an adjusting spindle on the side opposite to the hinge. By means of an extremely simple design of the plates, any mast can easily be tilted by one operator by means of an adjusting spindle, and can also be erected again without assistance. For this purpose, the foundation plate has spaced tabs with holes for a connecting pin, which is used to hold the end of the threaded spindle, while hook tabs for laterally gripping the aforesaid tabs are fastened at the base plate, to suspend the spindle adjusting mechanism. Thus, one installer can easily maintain the lights or measuring units or the like that are disposed on the masts. At this point, it should also be pointed out that maintenance, moreover, is also already simplified because the inventive masts greatly attenuate vibrations and thus preserve the lights. The special mast system makes it possible to fabricate masts in any length, with millimeter precision, from 2 meters to 10 meters above ground, so that ground irregularities and ground swells can be compensated very easily. Longer masts are preferably not fabricated integrally, but are assembled from two sections by means of a connecting pipe that has been laminated into the mast.

Other advantages, features, and details of the invention are found in the following description of some embodiments, as well as in terms of the accompanying drawings.

BRIEF DESCRIPTION OF THE DRAWINGS

FIG. 1 shows a tiltable flight navigation-light mast constructed pursuant to the invention.

FIG. 2 shows a magnified section along the line II—II in FIG. 1.

FIG. 3 again shows a magnified perspective view of the lower portion of the mast with a suspended adjusting spindle for tilting and again erecting.

DESCRIPTION OF THE PREFERRED EMBODIMENTS

Figure 4:
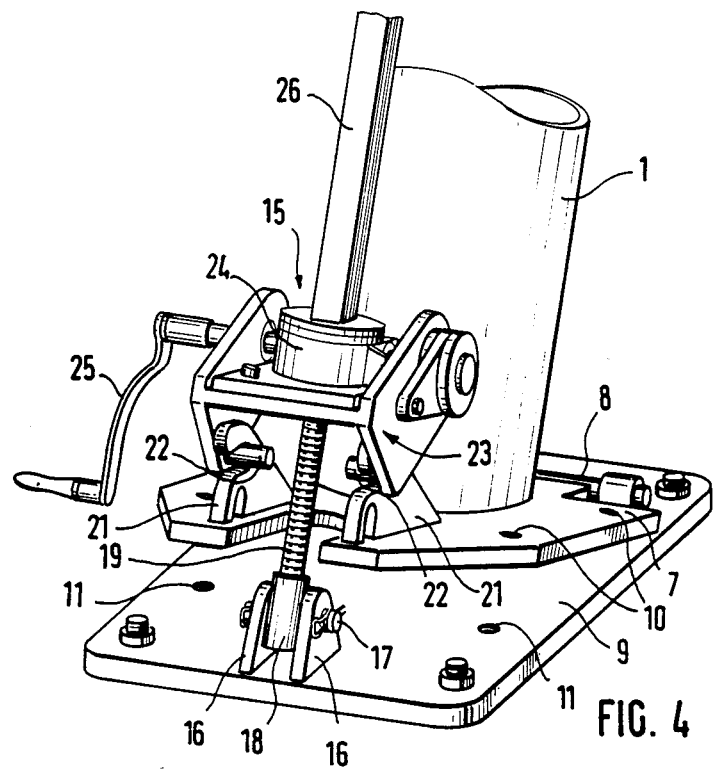
FIG. 4 shows a view corresponding to FIG. 3, when the mast is in its tilted position.

The mast 1 is fabricated as a glass-fiber reinforced plastic, preferably made of polyester, in a special rotational molding process. In the embodiment shown, the mast is composed of two superposed sections, which are connected together by a pipe piece 2, which has been laminated into the mast sections. In corresponding fashion, the upper cros-arm 3—which, for the flight navigation light mast that is shown here, bears the lamps 4—is also held at the tip of the mast 1 by means of a T-piece 5 laminated in—to the mast. By means of a laminated-in steel pipe 6, a base plate 7, made of metal, preferably also of steel, is fastened to the underside of the mast, the base plate 7 and the steel pipe 6 being welded together. The base plate 7 is pivotably hinged at a foundation plate 9 by means of a hinge 8. In the vertical operating position, the base plate 7 is fastened together with the foundation plate 9 by means of screws, which go through recesses 10 of the base plate and which can be screwed into the threaded borings 11 of the foundation plate. The screws can be designed at least partly as occludable screws so that they can not be loosened too easily by unauthorized persons.

Figure 5:
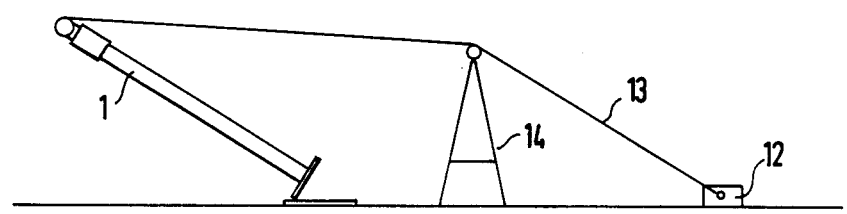
FIG. 5 shows a schematic view of the erecting and lowering of an inventive mast with the help of a cable winch and a cable deflection mast.

The mast can be tilted and can be erected again by means of a cable winch 12, which is schematically indicated in FIG. 5. Its cable 13 is deflected over a simple cable deflection mast 14, which is erected on the ground; in this way, an upward pulling force can be achieved even if the mast lies completely flat. Besides this, the mast can be tilted and erected again preferably by means of an adjusting spindle 15. Such a spindle is shown in FIGS. 3 and 4 in various operating positions.

Two spaced tabs 16 are integrally attached to the foundation plate 9 in order to attach this adjusting spindle 15. These two spaced tabs 16 accommodate a pin 17 received by a split-pin to hold the correspondingly drilled end 18 of the spindle 19. These tabs penetrate a recess 20 of the base plate 7, which on its part has two hook tabs 21 which are disposed laterally of the aforementioned tabs 16. A support section 23 of the spindle adjusting mechanism 24, which is equipped with appropriate pins 22, can simply be hooked into these hook tabs 21. By slanting the hook slots upwardly at an appropriate angle, the spindle is automatically arrested during its excursion, thus preventing the pins from falling out of the slots in the hook tabs 21. By means of the crank 25, the spindle 19 can be driven downwardly. A covering protective housing for the spindle is shown at 26. When the spindle is run out, the mast 1 is tilted about the hinge 8, as is shown in FIG. 4, until finally the mast lies completely horizontal on the ground. However, for maintenance purposes one will preferably not even strive for this completely horizontal deposition on the ground, but will let the mast stay in a slanted position where the installer can have access to the lights that are fastened at the cross-arm and thus can easily replace them, without an additional risk of damage being caused on the other side through contact with the ground.

I claim:

1. A mast for illuminating or measuring purposes such as for supporting flight navigation lights or wind measuring devices, comprising a mast made of glass-fiber or carbon-fiber reinforced plastic material, said mast being disposed on a mast-support foundation, said mast further comprising tilt means operable to tilt said mast relative to said foundation, said mast further comprising an elongated upright section having a longitudinal end, said tilt means comprising a base plate secured to said longitudinal end, a foundation plate secured to said mast-support foundation, hinge means pivotably mounting said base plate on said foundation plate, operable means operably disposed between said base plate and said foundation plate for effecting pivotable movement of said base plate on said foundation plate, said operable means comprising a threaded adjusting spindle means pivotably mounted on said foundation plate, an adjusting support means threadedly mounted on said spindle means, and connectable means connecting said adjusting support means to said base plate, said elongated upright section of said mast being made of a plastic material and said base plate being made of metal, a support pipe welded into said base plate, said plastic elongated upright section of said pipe being mounted on said support pipe, and threaded means for threadedly securing said base plate to said foundation plate when said mast is in an upright position with its longitudinal axis generally perpendicular to said foundation plate.

2. A mast according to claim 1, wherein said spindle means comprises an elongated threaded member having a longitudinal end, tab members on said foundation plate, and pin means pivotably connecting said longitudinal end of said threaded member to said tab members, said base plate having a cutout portion, said tab members extending through said cutout portion.

3. A mast according to claim 1, wherein said connectable means comprises pin elements, said base plate having hook tabs which receive said pin elements to thereby connect said connectable means to said base plate.

* * * * *